United States Patent [19]

Noble

[11] 4,124,020

[45] Nov. 7, 1978

[54] APPARATUS FOR COLLECTING SOLAR ENERGY

[76] Inventor: Haven D. Noble, P.O. Box 453, Lewiston, Minn. 55952

[21] Appl. No.: 646,605

[22] Filed: Jan. 5, 1976

[51] Int. Cl.² .............................................. F24J 3/02
[52] U.S. Cl. .................................................. 126/271
[58] Field of Search .......................... 126/271; 62/347

[56] References Cited

U.S. PATENT DOCUMENTS

| 3,145,707 | 8/1964 | Thomason | 126/271 |
| 3,146,774 | 9/1964 | Yellott | 126/271 |
| 3,215,134 | 11/1965 | Thomason | 126/271 |
| 3,270,739 | 9/1966 | Thomason | 126/271 |
| 3,387,602 | 6/1968 | Thomason | 126/271 |
| 3,722,227 | 3/1973 | Esser et al. | 62/347 |
| 3,893,506 | 7/1975 | Laing | 126/271 |
| 3,987,782 | 10/1976 | Meier, Jr. | 126/271 |
| 3,989,031 | 11/1976 | Thomason et al. | 126/271 |
| 3,991,742 | 11/1976 | Gerber | 126/271 |
| 3,994,278 | 11/1976 | Pittinger | 126/271 |
| 3,995,804 | 12/1976 | Folds et al. | 126/271 |

*Primary Examiner*—William R. Cline
*Assistant Examiner*—H. Jay Spiegel
*Attorney, Agent, or Firm*—Hill, Gross, Simpson, Van Santen, Steadman, Chiara & Simpson

[57] ABSTRACT

A solar energy collector has a corrugated, inclined plate exposed to solar rays on a blackened front or top side thereof. A heat-absorbing liquid carrier adheres to an opposite rear or undersurface of the plate in the form of a thin sheet by surface tension, and is directed gravitationally to a collection trough at the bottom edge of the plate.

5 Claims, 8 Drawing Figures

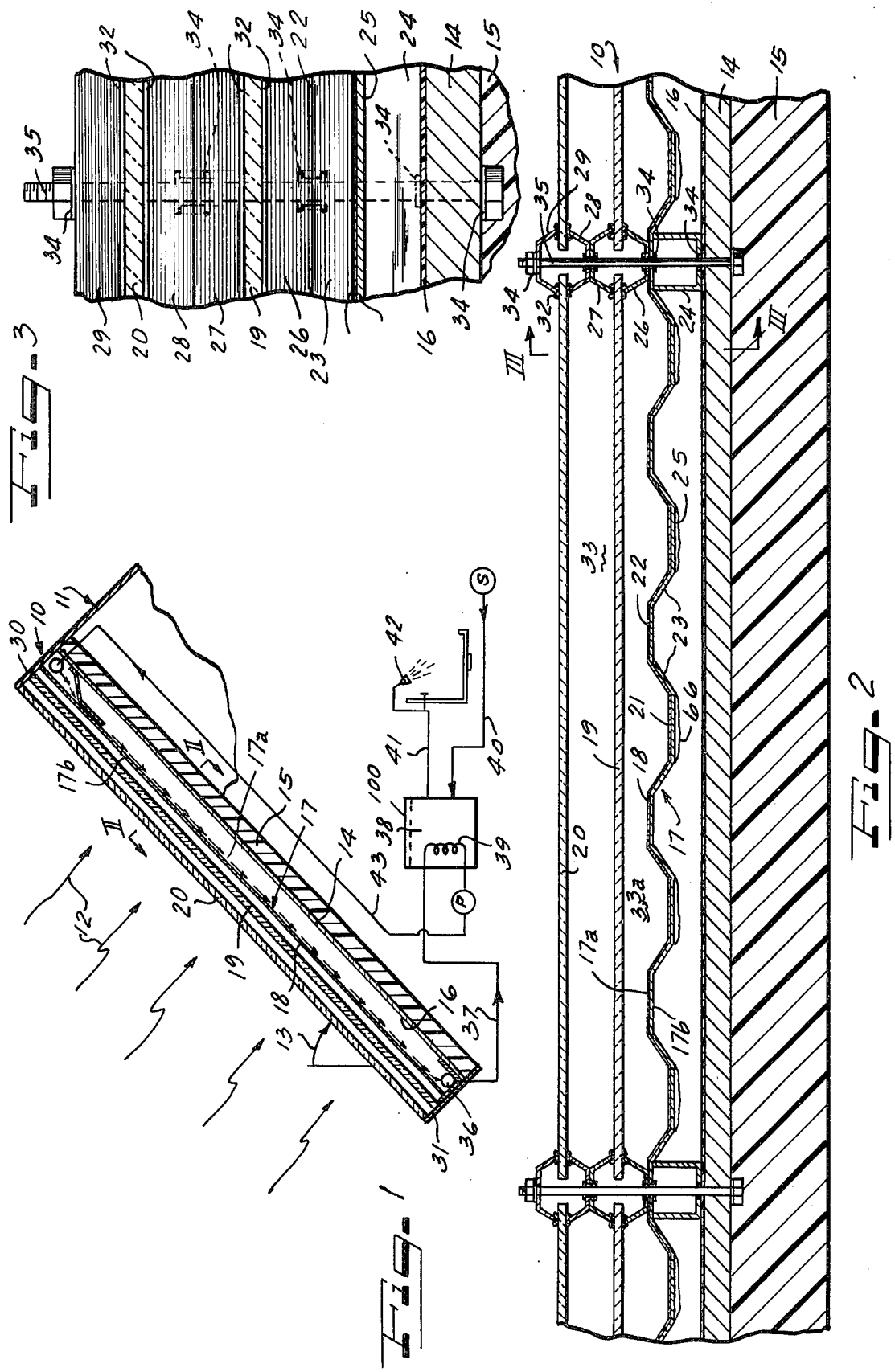

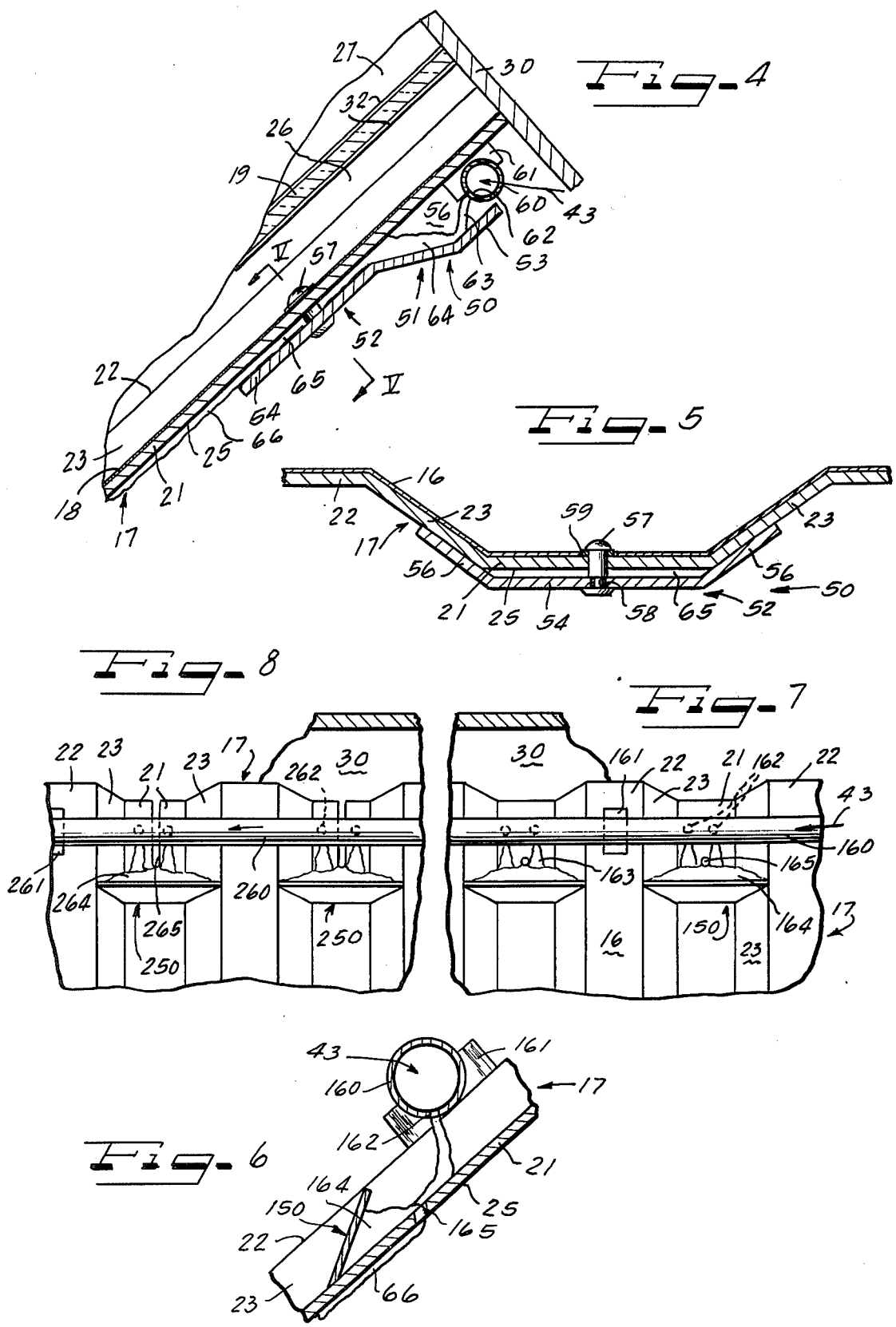

APPARATUS FOR COLLECTING SOLAR ENERGY

BACKGROUND OF THE INVENTION

1. Field of the Invention

The present invention relates to solar energy collection devices, particularly those employing flat plates which transfer their heat to liquid flowing thereon.

2. The Prior Art

U.S. Pat. No. 3,145,707 discloses the use of corrugated roofing sheets which are blackened on their upper surface and enclosed beneath a glass plate. Water is trickled over the top of the roofing sheets to collect heat absorbed therein. Such arrangement is deficient in that the water vaporizes upon heating and often condenses on the glass which is at a lower temperature thereby blocking and dispersing the sunlight and decreasing the efficiency of thermal energy collection. Further, water running over the top surface of the sheet material removes or erodes the blackened surface, thereby contaminating the carrier media and further reducing the efficiency of the entire system. The choice of blackening agents usable is also limited, many blackening agents in commmon use are so subject to both erosion by and dissolution in the heat transfer liquid that they cannot be economically or effectively used. Other constructions such as those employing tubes to enclose the liquid are unduly expensive and consumptive of materials. An internal-flow steel-sandwich collector described in the December, 1975, issue of "Popular Science", avoids a heat-transfer problem of the U.S. Pat. No. 3,145,707 from the ridges to the valleys, but adds expense in providing a second sheet of metal to achieve the internal flow.

SUMMARY OF THE INVENTION

Apparatus for collecting solar energy employs a thin, sheet-form, heat-conductive material. The conductive material is mounted at an inclination to the horizontal, forming upper and lower ends and first and second transfer surfaces corresponding to opposite faces of the material. Heat-absorbent carrier liquid is introduced in the form of a thin sheet or trickle onto at least a portion of the underface of the material near the upper end thereof from supply means which feeds the liquid to baffles defining flat metering flow channels. The liquid is formed and directed as a thin substantially uniformly running film adhering to the underface by surface tension or molecular adhesion effects. The opposite or upperface is exposed to solar energy and may be conveniently blackened or otherwise treated to improve its heat absorptive characteristics. Thermal energy is transferred by conduction to the liquid film and the liquid is collected at the lower end of the transfer surface and is passed to a point of storage or utilization. In a preferred embodiment, liquid is circulated entirely along the underface of the heat-conductive material and edges of the material are sealed against liquid and vapor passing to the front an upperface of the material, thereby avoiding condensation of the liquid vapor upon a glass protective sheet mounted thereover.

A second sheet may be mounted above the first sheet to insulate the first sheet from cold ambient air, thereby further reducing likelihood of condensation upon the glass.

BRIEF DESCRIPTION OF THE DRAWINGS

FIG. 1 is a general longitudinal section view through an apparatus embodying the principles of the present invention and showing schematically a plumbing or liquid flow diagram utilized in connection therewith.

FIG. 2 is a transverse sectional view of the apparatus taken on line II—II of FIG. 1.

FIG. 3 is a view showing additional structural details taken on line III—III of FIG. 2.

FIG. 4 is an enlarged fragmentary cross-sectional view showing additional details of a liquid inlet pipe and baffle assembly utilized in the structure of FIGS. 1-3.

FIG. 5 is a fragmentary transverse sectional view taken on line V—V of FIG. 4.

FIG. 6 is a view similar to FIG. 4 but showing an inefficient substantially prior art arrangement of top feed liquid inlet and baffling means.

FIG. 7 is a top perspective view of the structure of FIG. 6.

FIG. 8 is a view similar to FIG. 4 but showing another arrangement of top feed liquid inlet means.

DESCRIPTION OF THE PREFERRED EMBODIMENTS

A solar energy collecting apparatus 10 in accordance with this invention is shown generally in FIG. 1 and is shown for purposes of exemplification installed upon a roof 11 of a structure where it is exposed to impinging rays 12 of solar energy. It will be understood of course that the apparatus and the principles exemplified thereby could be physically embodied in any architectural or mechanical form wherein the solar collector can be exposed to the impingement of solar energy thereon. In the temperate latitudes of the northern hemisphere, the apparatus 10 is preferably inclined at an angle 13 from the vertical equal to about 10 degrees less than the latitude of the place of installation. The apparatus 10 is shown mounted upon a substantial foundation structure such as a sheet of plywood 14 which is insulated from the roof 11 by a layer of insulation 15 such as fiberglass or other suitable insulation material. A vapor barrier 16 covers the sheet 14, as shown in more detail in FIGS. 2 and 3.

The apparatus 10 itself comprises principally a metal plate or sheet form member 17. The sheet or plate 17 has first and second parallel faces, one of which is adapted to form a collector upperface 17a and the opposite one of which is adapted to form a solar energy transfer underface 17b. The sheet 17 itself is preferably made of material having good thermal conductivity characteristics so that the body of the sheet will, in effect, form a heat sink and a thermally conductive path between the collector upperface 17a and the underface 17b.

To enhance the ability of the collector face 17a in absorbing thermal energy which it receives from solar radiation 12, a layer 18 of black, light-absorbent material may be coated upon the upperface 17a.

Spaced above the plate 17 is a first sheet of insulating and protective glass 19, preferably clear and transparent to maximize energy transfer. A second sheet of clear transparent insulating, protective glass 20 is spaced thereabove. The plate 17 may conveniently comprise a pre-formed, corrugated material such as is used for roofing purposes, having flat valleys 21 and flat ridges 22 formed therein, joined together by inclined wall portions 23.

The plate 17 is spaced from the supporting surface 14 in the vapor barrier 16 by a spacer member 24, which engages an undersurface 25 of the plate 17 beneath a ridge 22. The first glass sheet 19 is spaced above the metal plate 17 by a spaceing member 26, and the second glass plate 20 is separated from the glass plate 19 by further spacers 27 and 28. The outer surface of the second glass sheet 20 is engaged by a cap member 29. The spacer members 26, 27, and 28 and the cap member 29 are conveniently formed as identical, elongate members, while the spacer 24 is a deeper but similarly elongate structure. The spacers support the glass sheets 19 and 20 by the edges thereof in the longitudinal direction, that is, downwardly inclined to the left in the orientation of FIG. 1.

End edges of the apparatus 10 are enclosed by a wall 30 at the upper end and a wall 31 at the lower end thereof. The metal plate 17 and the glass sheets 19 and 20 are sealed to the end walls 30 and 31 in any convenient liquid and vapor tight fashion. Longitudinal seals 32 are placed between each of the edges of the spacers 26, 27, and 28 and the cap 29 and the respective sheets 19 and 20. The seals 32 separate the air spaces 33 and 33a formed respectively between the plate 17 and first sheet of glass 19 and the two sheets of glass 19 and 20 from one another and the surrounding atmosphere. Ring seals 34 placed about a clamping bolt 35 in four places as shown in FIG. 2 complete the sealing process against vapor leaks along the bolt 35.

As shown schematically in FIG. 1, in order to transfer the collected thermal energy to some utilizable form, a liquid transfer carrier is provided for the solar energy collecting apparatus 10. For example, a liquid circulation system comprising a fluid collection trough 36 formed at the lower end 31 of the apparatus 10. The collection trough 36 communicates via a line 37 to a heat transfer chamber 38 where liquid within the tube 37 flows through a heat transfer coil 39. The heat transfer chamber 38 is fed through a line 40 from a source S of pallatable water. Heat is transferred from the coil 39 to the water from the source S within the chamber 38. The heated water is directed through a second pipe 41 to points of effective use such as a typical domestic use such as a shower 42. Fluid from within the heating coil 39 is pumped as by P through a further line 43 back to the top of the apparatus 10 beneath the upper edge wall 30, where it is again directed to the plate 17 for heating.

It is contemplated that a tank 100 (FIG. 1) for storage of heated liquid from the apparatus 10 may be provided. The carrier circuit which includes the pump shown schematically at P may additionally include a storage tank associated with the pump P. The carrier circuit may utilize any suitable transfer liquid including fresh water or water containing anti-freeze or other solutions of suitable transfer characteristics.

In accordance with the principles of the present invention, and referring to FIGS. 4 and 5, a baffle 50 is attached to the metal plate 17 about valley portions 21 thereof near the upper edge of the sheet 17 adjacent the edge wall 30 of the collector apparatus 10. In this preferred embodiment, the baffle 50 together with the plate 17 forms a header or liquid collection area 51 having a flow channelization portion 52. Lower walls 53 and 54 of the collection portion 51 and the channelization portion 52, respectively, extend parallel in spaced relation to the lower surface 25 of the valley portion 21 of the corrugated plate 17, thereby forming a flow channel which meters a laminar film flow of liquid onto the transfer surface 17b. The walls 53 and 54 are joined by an integral inclined wall portion 55. The baffle 50 is enclosed by side walls 56, 56 which extend parallel to the inclined portions 23 of the metal plate 17 and engage against the undersurfaces thereof. Each baffle 50 is affixed to the corrugated plate 17 by means of a single rivet 57 extending through the valley portion 21 and clinched against the undersurface of the wall portion 54 in the flow channel area 52. Since the rivet 57 is subjected to a flow of liquid, its axial portion is sealed against leakage by seals 58 and 59, as shown in FIG. 5.

Liquid is supplied to the header or collection portion 51 from the line 43 by means of a liquid supply pipe 60 which extends along the undersurface of the plate 17 below the valley portions 21 thereof and adjacent the upper end wall 30. The pipe 60 is attached to the corrugated plate 17 at intervals by support means 61 affixed thereto. The pipe 60 is apertured as at 62 at intervals corresponding to the regular valley portions 21 in the corrugated plate 17 to provide a controlled stream of liquid 63 into the collection portion 51 of each baffle assembly 50. The apertures 62 are sized to supply somewhat of a reservoir 64 within each baffle 50 for providing a uniform flow of liquid through the flow channel 65 formed between the wall 54 and the undersurface 25 of the valley portion 21 of the corrugated plate 17. This substantially uniform film flow of liquid will adhere to the lower surface of the valley portion 21 as at 66 beyond the wall 54 of the baffle 50 and cling by surface tension and continue to flow by gravity to the lower end 31 of the apparatus 10 and to the collection trough 36.

As depicted in FIGS. 6 and 7, a substantially prior art arrangements which has not proved to be efficient includes, a baffle 150 provided on the front surface of the corrugated plate 17 above the valley portion 21 and between adjoining, enclosing walls 23. The baffle 150 is sealed to the walls 21 and 23, 23 to receive and hold liquid from an inlet pipe 160 arranged above the corrugated plate 17 upon supports 161. Liquid within the pipe 160 provided from the line 43 flows through apertures 162 therein corresponding to each valley portion 21 in the corrugated plate 17 and collects in a header or reservoir 164 above each baffle 150. A flow port 165 comprising an aperture through the metal plate 17 in the valley portion 21 just above the baffle 150 permits liquid from the reservoir 164 to flow through the plate 17 in metered amounts to the undersurface 25 thereof. The liquid has a tendency to drop off at the port 165 and unless extremely controlled will resist, thin laminar flow 66 on the undersurface 25 of the valley portions 21 of the metal plate 17.

In FIG. 8, a baffle 250 is located in each of the valley portions 21 between adjacent walls 23 of the plate 17. An inlet pipe 260 is attached above the plate 17 to ridge portions 22 thereof via support stands 261. A flow port is provided by a slot-type aperture 265 extending from a reservoir 264 formed above the baffle 250. The slot 265 extends normally to the baffle 250, and upwardly to the edge of the plate 17.

The second sheet of glass 20 may be dispensed with along with the attendant expense thereof. This may increase the efficiency of the system by avoiding the absorption of energy in the second sheet of glass 20.

While it may be possible to employ a flat, non-corrugated material, the corrugated material 17 is readily available. It is sufficiently low in cost and offers construction and rigidity advantages, and therefor has been shown and described here.

Although minor modifications may be suggested by those versed in the art, it should be understood that I wish to embody within the scope of the patent warranted hereon all such modifications as reasonably and properly come within the scope of my contribution to the art.

I claim as my invention:

1. An apparatus for collecting solar energy comprising:

downwardly extending corrugated plate means having flat ridges and valleys formed therein, treated on a front face to improve solar energy absorption, when exposed to solar rays impinging thereon;

at least one protective glass sheet affixed in spaced, parallel relation above said face of said plate;

backing surface means spaced beneath said valleys of said plate by a distance from an undersurface of said plate;

a plurality of baffles each affixed to the underface of a respective one of the valleys of the corrugated plate near a gravitationally upward edge thereof;

liquid supply means at said upward edge of said plate gravitationally upwardly of said baffles and providing for liquid feeding at each location therealong corresponding to a baffle;

said baffles defining flat metering flow channel means at the underface of each valley of said downwardly extending plate and forming and directing the liquid fed thereto from said supply means as a thin substantially uniformly running film clinging by surface tension to the underface as the film runs to the gravitationally lowermost edge of the plate;

said flow channel means comprising a fixed space between said baffle and said underface of each valley;

said liquid supply means being arranged between said baffles and said undersurface of said plate;

said plate being sealed about its edges and throughout its area against passage of liquid and of liquor vapor from said underface to a space formed between said treated front face and said glass sheet, thereby, to avoid condensation of said vapor upon said glass sheet; and liquid collection means below said gravitationally lowermost edge of said plate;

whereby heat-absorbing liquid supplied by said supply means directed into said flow channel means is directed therefrom via said flow channel means to flow in a thin, flat film of thickness less than the distance between said valleys and said backing surface means and along each said flat underface of said valleys, being attracted thereto solely by surface tension of said liquid, and absorbing solar energy collected by said plate and transferred to the liquid film and the liquid film carrying said transferred solar energy to said collection means for utilization.

2. Apparatus according to claim 1, including means forming a closed liquid circuit through which a supply of the liquid is driven in the form of a stream including a heat transfer means in mid-circuit to remove thermal energy from the liquid.

3. Apparatus according to claim 1, wherein said front face of said corrugated plate means is treated with a coating of black material to enhance the solar energy collecting properties of the plate means.

4. Apparatus according to claim 1, including a second glass sheet pervious to solar energy and spaced from and parallel in overlying relation to said first mentioned glass sheet, and all edges of said sheets being sealed against passage of liquid and liquid vapor to the space between said sheets whereby condensation of vapor upon said second glass sheet is avoided.

5. Apparatus according to claim 1, including means forming a closed liquid circuit through which a supply of liquid is driven in the form of a stream and including heat transfer means in mid-circuit to remove thermal energy from the transfer liquid, said front face being treated with a black material to enhance the collecting properties of the plate means, and a second glass sheet pervious to solar energy and spaced from and parallel in overlying relation to said first mentioned glass sheet, and all edges of said sheets being sealed against passage of liquid and liquid vapor to the space between said sheets whereby condensation of vapor upon said second glass sheet is avoided.

* * * * *